J. J. CHARLEY.
SPRING SUSPENSION FOR VEHICLES.
APPLICATION FILED MAY 31, 1911.

1,013,742.

Patented Jan. 2, 1912.

2 SHEETS—SHEET 1.

Witnesses
Inventor
J. J. Charley
his Attorneys

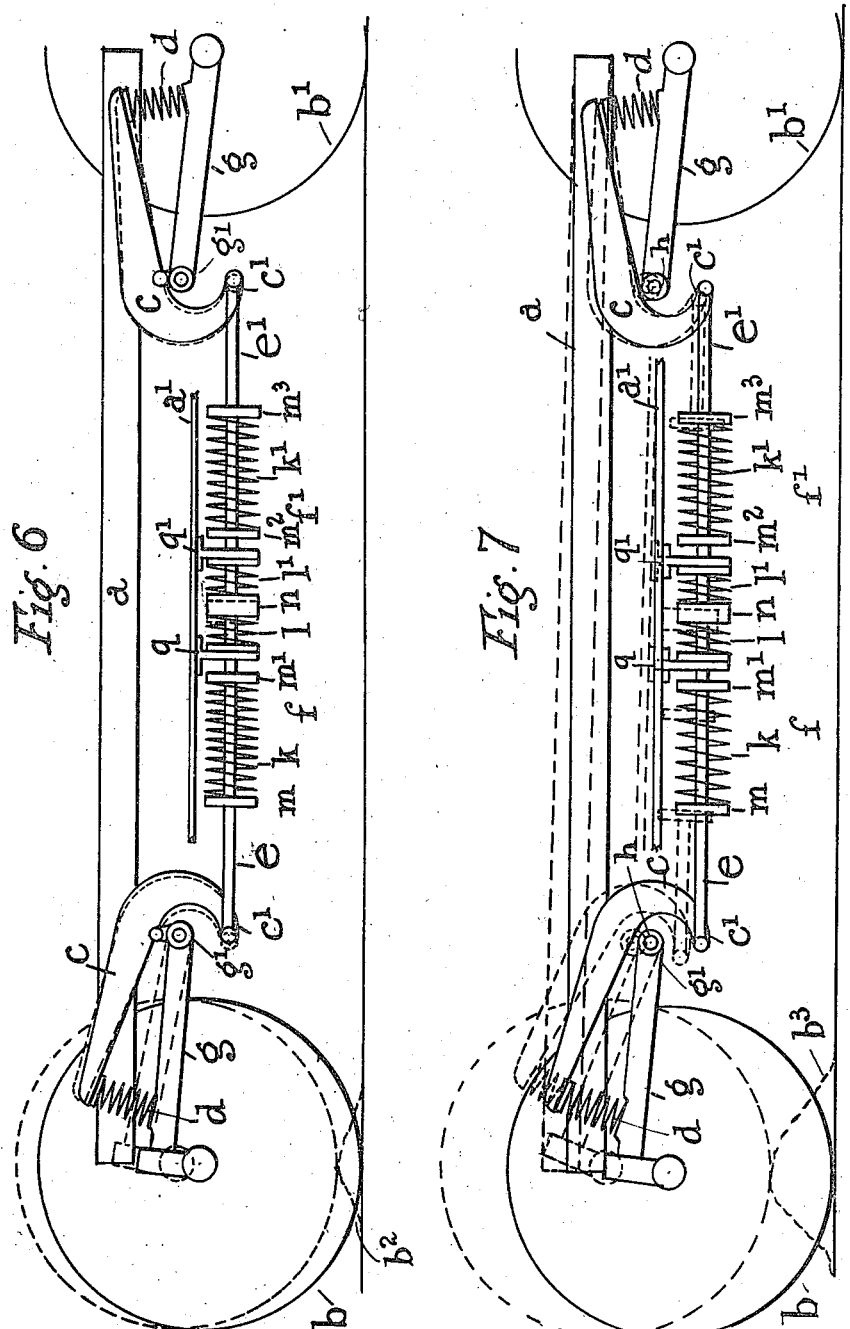

UNITED STATES PATENT OFFICE.

JOHN JOSEPH CHARLEY, OF MALVERN, VICTORIA, AUSTRALIA.

SPRING SUSPENSION FOR VEHICLES.

1,013,742.  Specification of Letters Patent.  Patented Jan. 2, 1912.

Application filed May 31, 1911. Serial No. 630,288.

*To all whom it may concern:*

Be it known that I, JOHN JOSEPH CHARLEY, a subject of the King of Great Britain and Ireland, &c., residing at Malvern, in the State of Victoria, Commonwealth of Australia, have invented certain new and useful Improvements in and Relating to Spring Suspension for Vehicles; and I do hereby declare the following to be a full, clear, and exact description of the invention, such as will enable others skilled in the art to which it appertains to make and use the same.

This invention relates to spring suspension for automobiles and other vehicles. Among its objects are the provision of certain combinations of springs, and road wheel mechanism whereby reduction of vibration is secured so that persons may ride in greater comfort, and freight be carried with less jolting. The parts provided distribute and mitigate shocks caused by road inequalities, and prevent passengers or goods from being severely shaken.

The effect of my mechanism when a gutter or an obstruction is overridden by a front or a back road wheel, is not only to minimize shocks but it also quickly brings back the said mechanism to normal after each such shock.

This invention permits of rubber or other solid tires being employed instead of pneumatic, and it reduces initial as well as maintenance costs. The Cardan joint usual in motor car driving shafts is not essential in my mechanism, as I fix the motor shaft in suitable alinement. I employ several features covered by my Patent No. 967,728, to the specification of which reference may be made. Thus I use wheels at each side in tandem, the set of wheels on one side of the vehicle not being directly connected to that on the other, but connections from one side to the other are provided by a forward and a rear transverse shaft. These keep the frames of the wheel sets in alinement, and support the members which secure the spring suspension to the vehicle body, or any frame carrying the latter. The car body or the like may have a spring frame, but such springs are superfluous, being obviated by my arrangement of springs at each side of the chassis.

Figure 4:
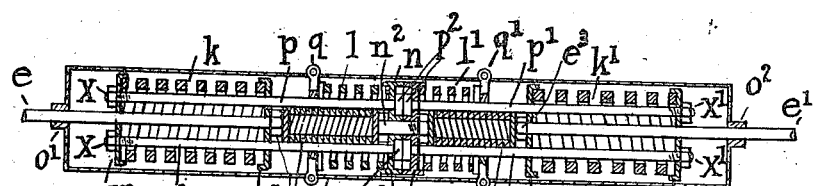

My construction is simple, having few parts, a good appearance, and not requiring much space, in motor cars the spring portions in Figure 4 being located beneath footboards.

The invention is illustrated in the accompanying drawings in which—

Figure 1:
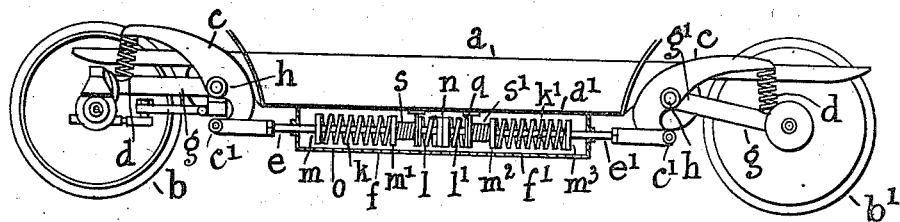
Figure 2:
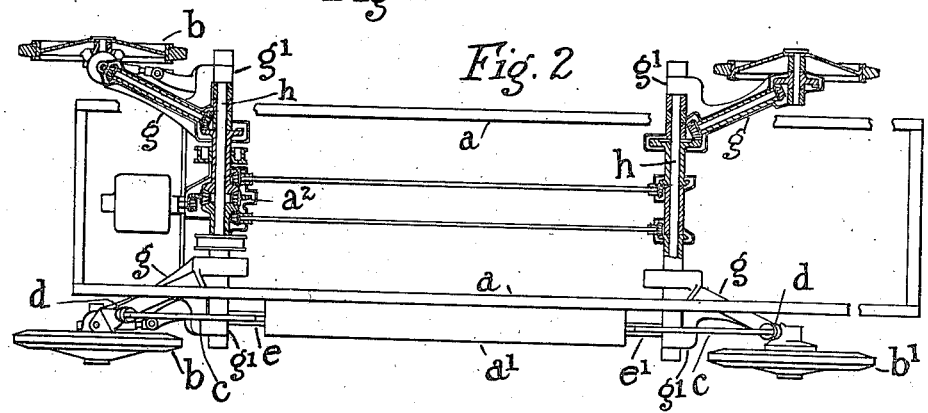
Figure 5:
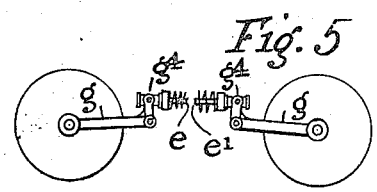
Figure 3:

Fig. 1 is a side elevation (in section through a casing) of parts of a motor car embodying my invention. Fig. 2 is a plan of Fig. 1, one side being in horizontal section. Fig. 3 is a vertical sectional view, on an enlarged scale, of the rocker spring. Fig. 4 is a sectional plan view, on an enlarged scale, of the cushioning device. Fig. 5 illustrates a modification of Fig. 1. Figs. 6 and 7 are diagrams in side elevation to illustrate the action of the parts when a road obstacle is encountered by a wheel.

If both of the front, or both of the rear road wheels simultaneously encounter a road obstacle or depression, the tilting or ducking (which is extremely disagreeable to passengers), of the car body will be less than in the case of all other constructions known to me.

I use a frame $a$, or underpart for the vehicle body. This frame has four road wheels, two front wheels $b$, and two rear wheels $b^1$. To each road wheel I apply a rocking member $c$, each having one end mounted upon or adapted to be acted upon by a spring $d$ which may be set on an arm $g$ described later as in the aforesaid patent. The other end of the rocker $c$ is downwardly bent, with its end, $c^1$, extended beyond the rocker pivot $h$, the lower rear end of a forward rocker being jointed or pivoted to a rearward connecting rod $e$, or in some cases a chain or cord, to operate a spring cushioning device, mainly at the front part $f$ thereof, but partly rearward. The lower front end of the rearward rocker $c$ on each side of the frame $a$ has a forward connecting rod $e^1$ also connected to the cushioning device, which it operates mainly at the rear part $f^1$ of said device. There will be at each side of the frame $a$, one of the spring devices $f\ f^1$ located intermediately between a forward and rear rocker. It may comprise a series of spiral springs, compressed air cylinders, or any other suitable shock absorbing and distributing means, using rubber, metal or other suitable materials. By my construction part $a$ may be located comparatively near the ground, admitting of the car body thereon being advantageously set low also. Any shock received by a road wheel on encountering a depression or obstruction is made to consecutively affect, but with diminishing force, the springs of the said series.

By causing the body of a car fitted with my invention to make a chart of its movements during its passage over irregularities of level of the road, it is found that the chart shows no sudden rise corresponding to such irregularities, but only a mild or gradual curve from and back to a normal horizontal line resulting from charting on a level road. Fig. 6 shows by dotted lines positions of various parts when the front wheel $b$ is passing over a small obstacle $b^2$. As these dotted lines show, the shock is divided between front and rear wheel devices, the car body or frame $a$ remaining horizontal or very nearly so.

When as in Fig. 7 wheel $b$ passes over an unusually high and abrupt obstacle $b^3$, a spring $l$ which is more fully explained later, will be fully compressed against a stop marked $q$ thus preventing the rod $e^1$ from moving farther forward. In this view wheel $b$ is raised, also rod $e$, which has also been drawn farther forward so compressing a spring $k$ undermentioned against a plate or buffer $m$. The front of the car body or frame $a$ is thus temporarily higher than its rear; the back of rear rocker $c$ is pressed down compressing spring $d$ below it. That is shocks to one road wheel are transmitted to another road wheel on the same side reversely.

In Figs. 1 and 4 my spiral spring arrangement is shown; in Fig. 2 the footboard $a^1$ covers the casing of these springs. As will be understood later, the parts in Fig. 4 besides transferring and mitigating shocks, act as a normalizing means, to stop the continuance of vibration from shocks, and quickly restore the various parts to their usual positions as when running on the level.

The springs $d$, under ends of rockers $c$ nearest the respective road wheels $b$ or $b^1$, are supported over any suitable part of an arm or bracket $g$, which acts at its outer end as a road wheel axle support, its inner end $g^1$ being pivoted in each case on a transverse axle $h$ at the front or the rear of the frame $a$, in a suitable manner as described for example in the specification of my aforesaid patent. As shown in Fig. 3, which shows also ends of parts $c$ and $g$, a tension spring $d^1$ may be set within spring $d$ to limit the range of action of the latter, and assist to return it to normal after it has been compressed by a jolt on a road wheel.

In the spiral spring intermediate mechanism there are two outer springs $k$, $k^1$, and two inner springs $l$, $l^1$, in a line. There are also outer abutment or buffer plates $m$, $m^3$, and inner abutment plates $m^1$, $m^2$. These, the springs, and other parts described later, are, as illustrated, conveniently housed within a casing $o$. This casing has guides or bearings for rods $e$, $e^1$ as apertures $o^1$, $o^2$.

A diaphragm $n$ between springs $l$, $l^1$, consists of two similar plates $n^1$, as seen in detail only in Fig. 4, bolted together by means of central bolt $n^2$, on the rear end of which is a nut. Plates $n^1$ have between them a recess which contains the heads $p^2$ of longitudinal connecting bolts or the like, two bolts at the front marked $p$, and two at the rear $p^1$. Springs $l$, $l^1$ are called diaphragm springs and $k$, $k^1$ buffer springs. The springs are set so that normally the rocker rods $e$, $e^1$ pull the bases of the pivoted rockers $c$ so that the said rocker rods at their heads or upper ends compress the springs $d$. It is the springs $d$ which, in effect, bear the car's weight.

Bolts $p$ pass through the plates $m^1$ and $m$, and the springs $l$, $k$, and have screwed ends on which are nuts $x$ against which abuts the plate $m$, the spring $k$ being slightly normally in compression and thus capable of further compression.

Bolts $p^1$ pass through the plate $m^2$, and are secured to the plate $m^3$ by nuts $x^1$, thus holding the spring $k^1$ in compression. With this construction each rod $e$ and $e^1$ will act upon the other, subject to the springs $l$, $l^1$.

On each rearwardly extending rod $e$ is a nut, $e^2$ or the like, next to the buffer or pressure plate $m^1$ so that the rod transmits the shock to the said plate when the rod $e$ is drawn forward. The plate then compresses the spring $k$ against the plate $m$ which acts on the long connecting rods $p$, and so transmits motion to the diaphragm $n$. The diaphragm is thus pulled forward against the second spring $l$ of the series, compressing the latter against a stop plate or member $q$ which is suitably fixed, as to the footboard of the car, or to the frame $a$. Spring $l$ by resisting said pull, limits the travel or compression of the spring $k$, and thus by its effect on the parts $e$, $c$, and $d$ the tilting up of the car body is restrained.

Rods $p^1$ or the like extend rearwardly beyond the diaphragm $n$, through the spring $k^1$ and the plate $m^3$ against which rests the rear end of the rear spring $k^1$; this spring is by the forward pull of the rods $p^1$ pressed against the frontal movable plate or buffer $m^2$, the motion of which will however be slight.

At the rear of the diaphragm $n$ is the third spring $l^1$ of the series abutting against a stop plate $q^1$ which is fixed as to the footboard $a^1$. The diaphragm $n$ is held between the springs $l$, $l^1$, normally centrally, and is by my arrangement of springs returned to normal after each road inequality is overridden, the other parts in Figs. 1 and 4 being also returned to normal. Parts $q$, $q^1$ are arranged not to obstruct any of the springs or rods.

When an obstruction (low $b^2$, or high $b^3$ see Figs. 6, 7) is met with by a back wheel $b^1$ it will cause a pull on rod $e^1$ by the forward end of the rear rocker $c$. This rod has a head $e^3$, and acts in a like manner to that described as to the rod $e$. Smaller springs $s$, $s^1$, Fig. 4, are called rocker rod head springs and inserted between the heads $e^2$, $e^3$ of the rods $e$, $e^1$, and the front and rear of the diaphragm $n$. When the springs $k$, $k^1$, are in normal positions the springs $s$, $s^1$ are compressed and act as solid buffers to the rod heads $e^2$, $e^3$, but act as followers when the springs $k$, $k^1$ are compressed.

I may add at will rubber or pneumatic cushions (not shown) as inside end plates $m$, $m^3$.

In the case of a comparatively slight obstruction like $b^2$ in Fig. 6, the parts which act after the front spring $d$ receives the jolt communicated by the road wheel, are— the front rocker $c$ which moves on its pivot $h$,—the rod $e$, which is pulled forward, the full series $f$, $f^1$ of the springs and buffer plates except parts $q$, $q^1$ and the casing $o$ which are fixed, the said series being pulled forward without alteration of any of the springs, except $l$ and $l^1$ ($l$ being compressed by the diaphragm $n$, and $l^1$ expanding to correspond), in addition the rod $e^1$ is pulled forward and swings the rear rocker $c$ on its pivot so compressing the rear spring $d$. In this way each such obstruction as $b^2$ has the shock it causes transmitted along the connected parts between the tandem wheels, the shock being so absorbed as not to appreciably jolt the car body. Casing $o$ is suitably fixed to the chassis or footboard.

In the case of the high obstruction $b^3$ action as above described with reference to Fig. 6 takes place, but the severity of the jolt on the front spring $d$ causes the additional action next indicated. A continuation of forward pull of the rod $e$ causes its head $e^2$ to push forward or advance the plate $m^1$, which compresses the spring $k$ against the plate $m$, which pressing on the nuts $x$ advances the rods $p$, which draw forward the diaphragm $n$, which in turn advance the rods $p^1$, which by pulling on the nuts $x^1$ advance the plate $m^3$, which compresses forwardly the spring $k^1$, thus advancing the plate $m^2$, and therefore the rod $e^1$. The final severity of the pull of the rod $e$ is thus transmitted through the said rod $e^1$ to the rear rocker $c$ and the rear spring $d$.

The various parts of my mechanism will in practice be adjusted to allow of action as described so that sizes and lengths of springs will be regulated accordingly, the drawings being merely diagrammatic.

$p$, $p^1$ are called diaphragm rods or bolts.

The invention is applicable whether all the road wheels be positively and simultaneously driven, or the rear, or the front wheels only.

It is to be understood that slight changes in the form, proportion and minor details of construction may be resorted to without departing from the spirit of the invention.

Having fully described my invention what I claim is.

1. In a spring suspension for vehicles, transverse shafts each having pivoted thereon at each side a rocker and a wheel carrying arm, a spring or cushion between each rocker and arm whereby a shock to a wheel is transmitted to its rocker, and an intermediate spring connection between the front and rear rockers to mitigate and transmit a shock to restore the mechanism to its normal position, substantially as described.

2. In a spring suspension for vehicles, a frame, transverse shafts for supporting the front and rear ends of the frame, arms pivotally connected to the shafts at each side of the frame, wheels carried by the arms, rockers pivoted on the shafts at each side of the frame, a spring for transmitting shocks on each wheel and the adjacent rocker and resilient means for connecting the rockers on the same side of the frame tending to keep the frame in normal position and further mitigate the shocks on the wheels, substantially as described.

3. In a spring suspension for vehicles, a frame, transverse shafts for supporting the frame, arms pivotally connected to the shafts at each side of the frame, wheels carried by the arms, rockers pivoted on the shafts at each side of the frame, a spring between each rocker and arm for transmitting a shock to a wheel to its rocker, a rod pivotally connected to each rocker, a pressure plate at the end of each rod, a buffer plate slidably mounted on each rod, a spring interposed between each pressure plate and buffer plate, means connecting the buffer plates together, and means for further relieving shocks on the buffer plates, substantially as described.

4. In a spring suspension for vehicles, a frame, transverse shafts for supporting the frame, arms pivotally connected to the shafts at each side of the frame, wheels carried by the arms, rockers pivoted on the shafts at each side of the frame, a spring between each rocker and arm for transmitting a shock to a wheel to its rocker, a rod pivotally connected to each rocker, a pressure plate at the end of each rod, a buffer plate slidably mounted on each rod, a spring interposed between each pressure plate and buffer plate, a diaphragm arranged intermediate the pressure plates, bolts connecting the diaphragm with the buffer plates, a fixed stop plate at each side of the diaphragm, and a spring interposed between the diaphragm and each stop plate, substantially as described.

5. In a spring suspension for vehicles, a frame, transverse shafts for supporting the frame, arms pivotally connected to the shafts at each side of the frame, wheels carried by the arms, rockers pivoted on the shafts at each side of the frame, a spring between each rocker and arm for transmitting a shock to a wheel to its rocker, a rod pivotally connected to each rocker, a pressure plate at the end of each rod, a buffer plate slidably mounted on each rod, a spring interposed between each pressure plate and buffer plate, a diaphragm arranged intermediate the pressure plates, bolts connecting the diaphragm with the buffer plates, a fixed stop plate at each side of the diaphragm, a spring interposed between the diaphragm and each stop plate, and a spring arranged between the diaphragm and the inner ends of each said rod, substantially as described.

In witness whereof I have hereunto set my hand in the presence of two witnesses.

JOHN JOSEPH CHARLEY.

Witnesses:
WILLIAM L. BEATTIE,
BEATRICE M. LOWE.